Nov. 28, 1967 N. COSTOPOULOS Re. 26,314

(BOWLING PIN WITH WOUND FILAMENT REINFORCEMENT)
WOUND FILAMENT REINFORCEMENT FOR SOLID
CORED STRUCTURE
Original Filed Nov. 30, 1961

INVENTOR

Nick Costopoulos,

BY Griffin and Branigan

ATTORNEYS

United States Patent Office

Re. 26,314
Reissued Nov. 28, 1967

26,314

[BOWLING PIN WITH WOUND FILAMENT REINFORCEMENT] *WOUND FILAMENT REINFORCEMENT FOR SOLID CORED STRUCTURE*

Nick Costoposlos, Box 192, Sunrise, Wyo. 82231

Original No. 3,152,804, dated Oct. 13, 1964, Ser. No. 155,958, Nov. 30, 1961. Application for reissue Oct. 22, 1965, Ser. No. 505,225
10 Claims. (Cl. 273—82)

Matter enclosed in heavy brackets [ ] appears in the original patent but forms no part of this reissue specification; matter printed in italics indicates the additions made by reissue.

This invention relates to bowling pins, and in particular to a bowling pin having a reinforcing coating, applied over a wooden core.

In the bowling business, pin life is the dominant economic factor, and much effort has been expended in attempts to improve the pins in this regard. The problem is somewhat complex due to the need for conforming to the rigid standards set for official bowling pins.

It is therefore a general object of the present invention to extend the useful life of bowling pins. More particularly, it is an object to extend bowling pin life by an outer coating having high impact resistance.

A related object is to provide a coating having high shock resistance, and which also specially reinforces the wooden core against fracturing or splintering.

These and other objects, which will be readily apparent, are attained by the present invention which may be briefly described as comprising a wooden core with annular grooves in its surface, receiving a plastic cord or filament under tension, which latter is encased in a plastic coating, and successive, outer layers of cord, each encased in a plastic coating.

For a more detailed description of the invention, reference is made to the following specification, as illustrated in the drawing, in which.

Figure 1:
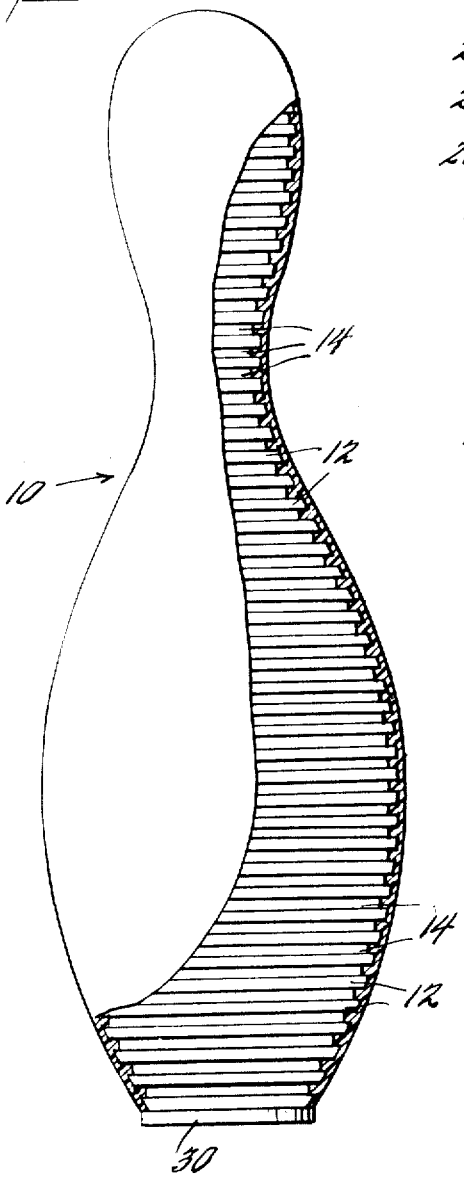
FIGURE 1 is an elevational view of the coated pin, with the coating broken away from a part of its surface to expose the wooden core.
Figure 2:
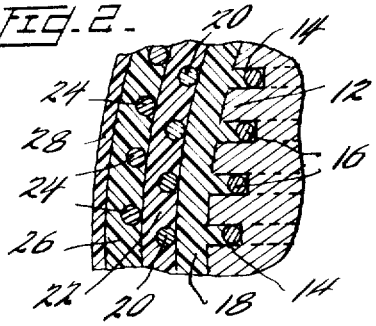
FIGURE 2 is a fragmentary view of a part of the core, near the surface of the pin, showing the cords and the coating material in section.
Figure 3:
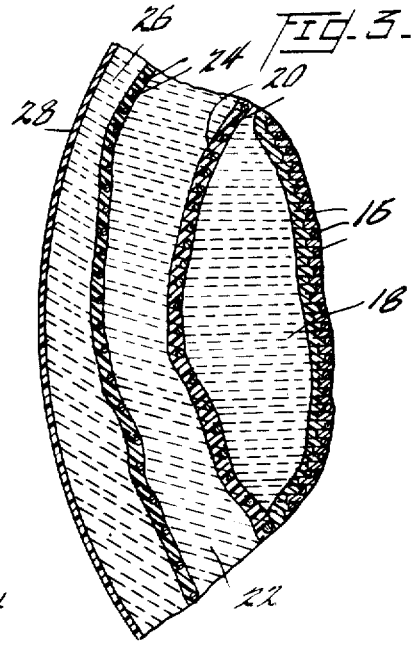
FIGURE 3 is a fragmentary view of a portion of a pin near the surface, broken away sequentially to illustrate the separately applied coating layers, together with the cords which they encase.

Referring to the drawing by characters of reference, there is shown a bowling pin, indicated generally by the numeral 10, the major bulk of which is contained in a wooden core 12 of standard pin stock. From top to bottom, the outer surface of the wooden core is provided with outwardly open, spaced, annular grooves 14, arranged in planes perpendicular to the pin axis. In the preferred form shown, the grooves have a depth of 1/16 inch, and a width of 1/32 inch, and are spaced apart a distance of 1/16 inch. The grooves constitute a seat for a binding cord, which provides the main reinforcement for the wooden core. This cord, indicated by the numeral 16 is preferably a nylon filament roving, of yarn form, and when applied is subjected to a tension of 10 to 15 pounds. With the annular grooves each separate and complete, as in the form shown, the winding of the cord will involve a cross-over to the next groove, as each groove is filled. However, it will be understood that diagonal, communicating passages may be provided between the grooves, if deemed necessary or desirable. Likewise, the dimensions of the grooves and their spacing are susceptible of variation.

The cord is held in place by a base layer 18 of plastic coating, and suitable coating materials are known in the art and readily available, one example being "Endurite," a plastic pin patch, which is a product of the American Machine and Foundry Co. As stated, the first cord layer is the most important, and its binding matrix is also the thickest of the applied coatings, being 1/8 inch thick in the form shown, and filling the grooves above the cord 16, and extending 1/16 inch outwardly of the core body. This constitutes one ply of the plastic coating.

In the successive plies, the cords are arranged at angles to the base cords 16, to provide an internal pattern giving a more favorable distribution of stresses due to applied impact loads. Thus, whereas the cords 16 are arranged at 90° to the vertical (that is, the pin axis), the second layer of cords 20 is helically wound on the surface of coating 18, with a pitch such that the cord lies at an angle of 110° with the vertical. It will be understood that curing of each layer is effected before application of the next cord and its matrix, the curing time being two to three hours at a room temperature of about 70° F. Shrinkage of the coatings on curing adds strength to the pin over and above that contributed by the tension in the nylon cord.

After winding of the second cord, its matrix coating 22 is applied to a thickness of 1/16 inch and cured. The final layer of cord 24 is helically wound on the surface of the second coating 22, at an angle of 120° to the vertical, so that the cord extends crosswise of both cords 16 and 20, and the third cord is covered with a matrix of plastic 26, 1/16 inch thick, which is cured. This third coating can be applied by dipping, or spread on and buffed to acquire the desired smooth finish. At this stage, decals can be applied, and neck painting effected, after which a final, clear finish coat 28 can be applied by a dip method.

At the bottom of the pin, a base ring 30 of "Teflon" or the like plastic may be applied.

It will be understood that the angular dispositions given for the cords it not limiting, and that the resulting neutralization of directional characteristics in the reinforcing coating can be accomplished by patterns involving a considerable range of angles, including negative angles. Likewise, the thicknesses of the coatings may be varied within reasonable limits.

In a pin constructed according to this invention, the life is two to three times that of an ordinary pin, and gives two to three times more lineage per pin than the best plastic coated pin heretofore available. Cleaning the pin is an easy process of buffing with a soft steel brush. The strength characterisitcs are so enhanced that it is impossible, under normal playing conditions, for the wood core to give way or to break off at the neck section, a zone which is always considered critical in pin design.

At the same time, the pin is relatively simple of manufacture, and involves no problems in the matter of maintaining the standard weight and balance within the permissible degrees of tolerance.

Generally speaking, while a preferred embodiment has been disclosed, for purposes of illustration, modifications will become apparent, in the light of this discloseure, and the invention should not, therefore, be deemed as limited, except insofar as shall appear from the spirit and scope of the appended claims.

I claim:

1. A composite bowling pin *having the size and shape of a bowling pin,* comprising a wooden core with annular surface grooves in planes perpendicular to the pin axis, a first continuous length of plastic filament received successively in said grooves in a state of tension, a first plastic matrix filling said grooves, in enveloping relation to said filament, and having an outer surface outwardly of said core, a second continuous length of filament helically wound on the surface of said first matrix, a second plastic matrix enveloping said second length of filament, a third continuous length of filament helically wound on the surface of said second matrix, *at least one of said second and third lengths of filament being at a different angle to said pin axis than the first length of filament,* a third matrix enveloping said third length of filament, and an outer finish coating on said third matrix, the outer surface of each of said matrices having the general form of the finished pin.

2. A pin as in claim 1, said second length of filament being disposed at an angle of about 110° to the pin axis, and said third length of filament being disposed at an angle of about 120° to the pin axis.

3. A pin as in claim 1, said second and third lengths of filament being disposed at different angles to the pin axis.

4. A composite bowling pin *having the size and shape of a bowling pin,* comprising a wooden core with annular surface grooves in planes perpendicular to the pin axis, a first continuous length of plastic filament received successively in said grooves in a state of tension, a first plastic matrix filling said grooves, in enveloping relation to said filament, and having an outer surface outwardly of said core, a second continuous length of filament helically wound on the surface of said first matrix, a second plastic matrix enveloping said second length of filament, a third continuous length of filament helically wound on the surface of said second matrix, *at least one of said second and third lengths of filament being at a different angle to said pin axis than the first length of filament,* and a third matrix enveloping said third length of filament, the outer surface of each of said matrices having the general form of the finished pin.

[5. A composite bowling pin comprising a wooden core with annular surface grooves in planes perpendicular to the pin axis, a first continuous length of plastic filament received successively in said grooves in a state of tension, a first plastic matrix filling said grooves, in enveloping relation to said filament, and having an outer surface outwardly of said core, a second continuous length of filament helically wound on the surface of said first matrix, a second plastic matrix enveloping said second length of filament, a third continuous length of filament helically wound on the surface of said second matrix, and a third matrix enveloping said third length of filament.]

6. A composite bowling pin *having the size and shape of a bowling pin,* comprising a wooden core with annular surface grooves, a *first* continuous length of plastic filament received successively in said grooves in a state of tension, [and] a *first* plastic matrix filling said grooves, in enveloping relation to said *first* filament, said *first* matrix having an outer surface outwardly of said core, *a second filament wound on the surface of said first matrix at a different angle to the axis of said pin than the first filament, and a second plastic matrix enveloping the second filament winding and having the general form of said core.*

[7. A composite bowling pin comprising a wooden core with annular surface grooves, a plastic cord wound successively under tension in said grooves, a first matrix enveloping said cord, a second matrix containing a plastic cord enveloping said first matrix, and a third matrix containing a plastic cord enveloping said second matrix, the latter two cords being respectively disposed at two different angles to the first-mentioned cord.]

*8. In an elongated structure having a wooden core along an axis thereof, the combination comprising:*

*a plurality of annular surface grooves on said core, said grooves being in planes substantially perpendicular to said axis;*

*a first continuous length of plastic filament received successively in said grooves in a state of tension;*

*a first plastic matrix filling said grooves, in enveloping relation to said filament, and having an outer surface outwardly of said core;*

*a second continuous length of filament helically wound on the surface of said first matrix;*

*a second plastic matrix enveloping said second length of filament;*

*a third continuous length of filament helically wound on the surface of said second matrix, at least one of said second and third lengths of filament being at a different angle to said elongated structure axis than the first length of filament;*

*a third matrix enveloping said third length of filament; and an outer finish coating on said third matrix, the outer surface of each of said matrices having the general form of said core.*

*9. The structure of claim 8 wherein said second length of filament is disposed at an angle of about 110° to said axis, and said third length of filament is disposed at an angle of about 120° to said axis.*

*10. A structure as in claim 8 wherein said second and third lengths of filament are disposed at different angles to said axis.*

*11. In an elongated structure having a substantially solid wooden core along an axis thereof, the combination comprising:*

*a plurality of annular surface grooves on said core, said grooves being in planes substantially perpendicular to said axis;*

*a first continuous length of plastic filament received successively in said grooves in a state of tension;*

*a first plastic matrix filling said grooves in enveloping relation to said filament and having an outer surface outwardly of said core;*

*a second continuous length of filament helically wound on the surface of said first matrix;*

*a second plastic matrix enveloping said second length of filament;*

*a third continuous length of filament helically wound on the surface of said second matrix;*

*at least one of said second and third lengths of filament being at a different angle to said elongated structure axis than the first length of filament;*

*and a third matrix enveloping said third length of filament, the outer surface of each of said matrices having the general form of said core.*

*12. In an elongated structure having a substantially solid wooden core along an axis thereof, the combination comprising:*

*a plurality of annular surface grooves on said core;*

*a first continuous length of plastic filament received successively in said grooves in a state of tension;*

*a first plastic matrix filling said grooves in enveloping relation to said first filament, said first matrix having an outer surface outwardly of said core;*

*a second plastic filament wound on the surface of said first matrix at a different angle to the axis of said pin than the first filament, and a second plastic matrix enveloping the second filament winding and having the general form of the core.*

References Cited

The following references, cited by the Examiner, are of record in the patented file of this patent or the original patent.

UNITED STATES PATENTS

| | | |
|---|---|---|
| 2,151,307 | 3/1939 | Smith. |
| 2,166,950 | 7/1939 | German et al. |
| 2,399,324 | 4/1946 | Clark. |
| 2,876,011 | 3/1959 | Hunt. |
| 3,025,062 | 3/1962 | Dullin. |

(Other references on following page)

UNITED STATES PATENTS

| | | | |
|---|---|---|---|
| 1,354,738 | 10/1920 | Gates | 156—172 X |
| 1,878,885 | 9/1932 | Pahl | 156—172 |
| 1,979,954 | 11/1934 | Bergman | 156—172 X |
| 2,535,033 | 12/1950 | Bergere | 273—82 |
| 2,573,361 | 10/1951 | Rodgers et al. | 273—80 X |
| 2,742,931 | 4/1956 | Ganahl. | |
| 3,135,639 | 6/1964 | Bilodeau | 273—82 X |

| | | | |
|---|---|---|---|
| 3,141,672 | 7/1964 | Unterbrink | 273—82 |
| 3,189,510 | 6/1965 | Eldred | 156—189 X |
| 3,257,113 | 6/1966 | Medney | 273—82 |

FOREIGN PATENTS

| | | |
|---|---|---|
| 555,027 | 7/1943 | Great Britain. |

ANTON O. OECHSLE, *Primary Examiner.*

DELBERT B. LOWE, *Examiner.*